United States Patent [19]

Yamamoto et al.

[11] Patent Number: 5,019,964
[45] Date of Patent: May 28, 1991

[54] DEVICE FOR INTERFACING DATA COMMUNICATIONS

[75] Inventors: Akito Yamamoto, Yokohama; Takashi Ueno; Akio Sumizawa, both of Yokosuka, all of Japan

[73] Assignee: Nissan Motor Co., Ltd., Japan

[21] Appl. No.: 89,064

[22] Filed: Aug. 25, 1987

[30] Foreign Application Priority Data

Aug. 27, 1986 [JP] Japan ............... 61-200967

[51] Int. Cl.⁵ ........................................... G06B 15/00
[52] U.S. Cl. ............................... 364/200; 364/239;
364/238.6; 364/244; 364/244.8; 364/251;
364/251.3
[58] Field of Search .............. 364/131, 200 MS File,
364/900 MS File

[56] References Cited
U.S. PATENT DOCUMENTS

| 4,034,346 | 7/1977 | Hostein | 364/200 |
| 4,048,673 | 9/1977 | Hendrie et al. | 364/200 |
| 4,106,091 | 8/1978 | Hepworth et al. | 364/200 |
| 4,375,078 | 2/1983 | Thoma | 364/200 |
| 4,387,433 | 6/1983 | Cardenia et al. | 364/200 |
| 4,538,224 | 8/1985 | Peterson | 364/200 |
| 4,628,436 | 12/1986 | Okamoto et al. | 364/131 |
| 4,700,292 | 10/1987 | Campanini | 364/132 |

Primary Examiner—Stuart N. Hecker
Assistant Examiner—Rebecca L. Rudolph
Attorney, Agent, or Firm—Leydig, Voit & Mayer

[57] ABSTRACT

A device for data interfacing between a transmitter having a processing unit and a receiver having another processing unit in which data is automatically fetched from a bus connected to the processing unit in the transmitter and transmitted to a data transmission line and the data from the data transmission line is held in the receiver. The processing unit in the transmitter does not participate in the data transmission and the other processing unit in the receiver can fetch the reception data at any time. Thus loads imposed on the processing units in the transmitter and in the receiver can greatly be reduced.

11 Claims, 2 Drawing Sheets

DEVICE FOR INTERFACING DATA COMMUNICATIONS

BACKGROUND OF THE INVENTION

The present invention relates to a communication interface device in which parallel form data obtained at a processing unit of a transmitter is converted into serial form and is transmitted on a data transmission line, and, on the other hand, other serial form data is converted into parallel form and is supplied to the same or other processing unit of a receiver.

Such kinds of interface devices are commercially available. Product name μPD76051 produced by NEC (Nippon Electric Company Limited) can constitute such interface devices when the elements are installed at the transmitter and receiver in which case, the interface elements are connected respectively to the buses of CPUs (Control processing Units). Each CPU constitutes the corresponding processing unit at the transmitter side and receiver side.

Data communications are carried out in data frames of 7 bit or 8 bit units. When the CPUs at both transmitter and receiver sides execute programs, data are supplied to the interface devices and the data are fetched via the interface at the receiver.

Since in normal cases an interrupt processing for these data is carried out for transmitting and receiving data, a problem in that the communication overhead of both CPUs becomes very large arises.

For example, in a case when an engine control for a vehicle is to be executed on a real time basis, the control must be performed within a 2 millisecond period and the amount of data to be transferred during that period is 32 bytes at minimum. Therefore, during that period an average of one unit of data must be transferred every 62.5 microseconds and then the communication program is interrupted and executed each 62.5 microseconds. Consequently, the amount of time allocated to calculation for the engine control is extremely short.

SUMMARY OF THE INVENTION

It is an object of the present invention to provide a device for a communication interface which greatly reduces the communication overhead and increases the processing speed of processing circuits in a transmitter and in a receiver.

Accordingly, the present invention provides an interface device comprising a data storage unit which communicates with a data bus which, in turn, communicates with a CPU. The data storage unit includes a dual port memory, a counter, and a timing control circuit. The dual port memory has several storage locations for storing data supplied via the data bus. Each storage location of the dual port memory has an address which is determined according to a counted value in the counter and the address is transmitted from the counter to the dual port memory via the timing control circuit. This significantly reduces the processing load on the CPU, thereby increasing the speed at which data is processed.

DETAILED DESCRIPTION OF THE PREFERRED EMBODIMENTS

Reference will hereinafter be made to the drawings in order to facilitate understanding of the present invention.

Figure 1:
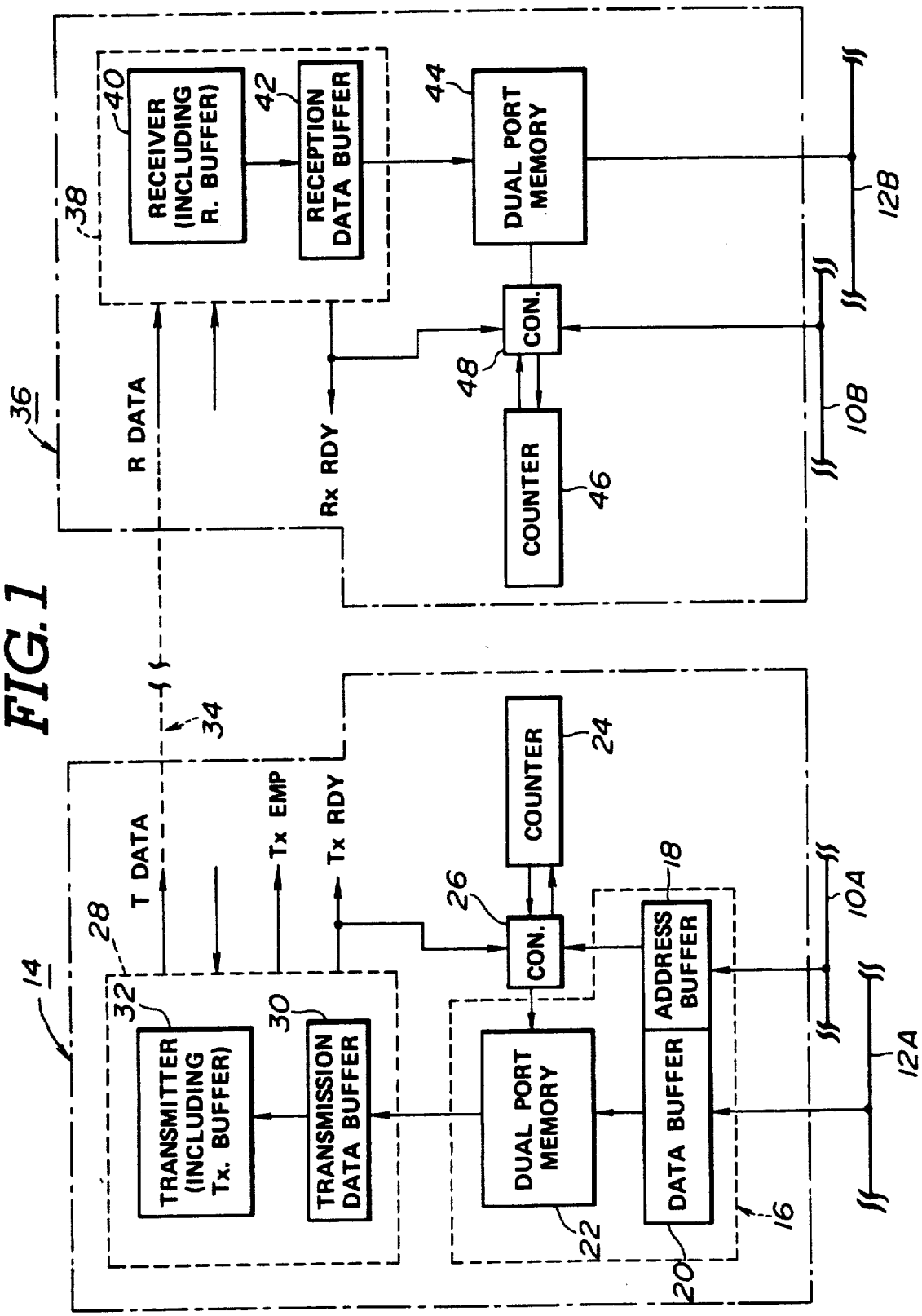
FIG. 1 is a circuit block diagram of a device for a communication interface in a first preferred embodiment according to the present invention.

FIG. 1 shows a first preferred embodiment of a communication interface device.

An address bus 10A and data bus 12A provide respective data, i.e., transmission data and address data from a CPU (Central Processing Unit) in a transmitter (not shown). These parallel data are fed into an address buffer 18 and data buffer 20 of a data storage circuit 16 installed in a transmission interface 14, respectively. The parallel data in a data buffer 20 are stored and held in a dual port memory 22. Each storage address of the dual port memory 22 is determined by a counted value in the counter 24 and the storage address of the parallel data is transmitted from the counter 24 to the dual port memory 22 via a timing control circuit 26. In addition, a read address of the parallel data stored and held in the dual port memory 22 is also specified by means of the counted value in the counter 24. When the read address is transmitted via the timing control circuit 28, the parallel data at the read address is read out in a transmission data buffer 30 of a transmission unit 28.

Furthermore, when the parallel data in the transmission data buffer 30 is transferred to a transmission buffer in a transmitter 32, the data is converted into serial data and the serial data is transmitted to a data communication line 34.

At this time, the transmission data buffer 30 becomes empty and the transmission unit 28 outputs a signal TX RDY indicating that the transmission data buffer 30 has become empty due to the transmission of the data previously stored therein to the timing control circuit 26. The timing control circuit 26 then transmits a count up clock to the counter 24.

In the way described above, when the transmission interface 14 transmits the parallel data loaded into the buffer 30 from the data bus 12A of the CPU on the transmitter side, the data in the data bus 12A is written into the address of the dual port memory 22 which is indicated by the counted value of the counter 24. The CPU in the transmitter does not participate in the writing of the data into the address in the dual port memory 22. It is noted that the number of data transmissions data is counted by the counter 24 and the counted value in the counter 24 serves to specify the read and write addresses in the dual port memory 22. It is also noted that the read and write address specifications are switched by means of the timing control circuit 26 so that data collision and or contention between write and read of data in the dual port memory 22 can be avoided.

It is, however, noted that contention of write and read of data can also be avoided by commanding the CPU in the transmitter to stop the data transmission or by adjusting the transfer relationship of the basic clock. In these cases, neither the address buffer 18 nor timing control circuit 26 is necessary.

The serial data T DATA transmitted in the data transmission line 34 from the transmission interface 14 is received by the receiver 40 as reception data R DATA. The receiver 40 is installed in a reception unit 38 in a reception interface 36. The receiver 40 converts received serial form data R DATA into parallel form and transmits the converted received data to a reception buffer incorporated therein. The parallel received data in the reception buffer is transferred into a reception data buffer 42. The parallel data is written into a dual port memory 44.

The write address in the dual port memory 44 is specified by a count value of the counter 46. The write address is transmitted via a timing control circuit 48 to the dual port memory 44. When the reception data buffer 42 becomes empty with the parallel data in the reception data buffer 42 written into the dual port memory 44, an RX RDY signal indicating that the reception data buffer 42 has become empty is outputted from the reception unit 38 to the timing control circuit 48. At this time, the timing control circuit 48 outputs a count up clock to the counter 46 so that the counter 46 counts the number of times data is received.

In addition, access of a CPU in the receiver to the dual port memory 44 during the writing of the received data into the dual port memory 44 is inhibited by means of the above-described signal RX RDY. When the inhibit described above is released, the parallel data is fetched from the dual port memory 44 into the CPU in the receiver.

Since the read address of the parallel data is transmitted from the address bus 10B to the dual port memory 44 via the timing control circuit 48, the parallel data read from the corresponding address in the dual port memory is read from the dual port memory 44 into a data bus 12B.

As described above, since in the communication interface device in the first preferred embodiment, the CPU in the transmitter does not participate in the data transmission but the CPU in the receiver can utilize the received data at any time, the processing load required for the CPUs in the transmitter and receiver to carry out data transmission can greatly be reduced. Hence, it becomes possible to greatly increase data processing speeds. Hence, real time control of the vehicular engine performance and so on as described in the background of the invention can be carried out at an extremely high speed.

It is noted that if whenever the count value of the counter 24 reaches a predetermined value, the counter 24 is reset, the transmission of data can be carried out for unit containing any amount of data.

Figure 2:
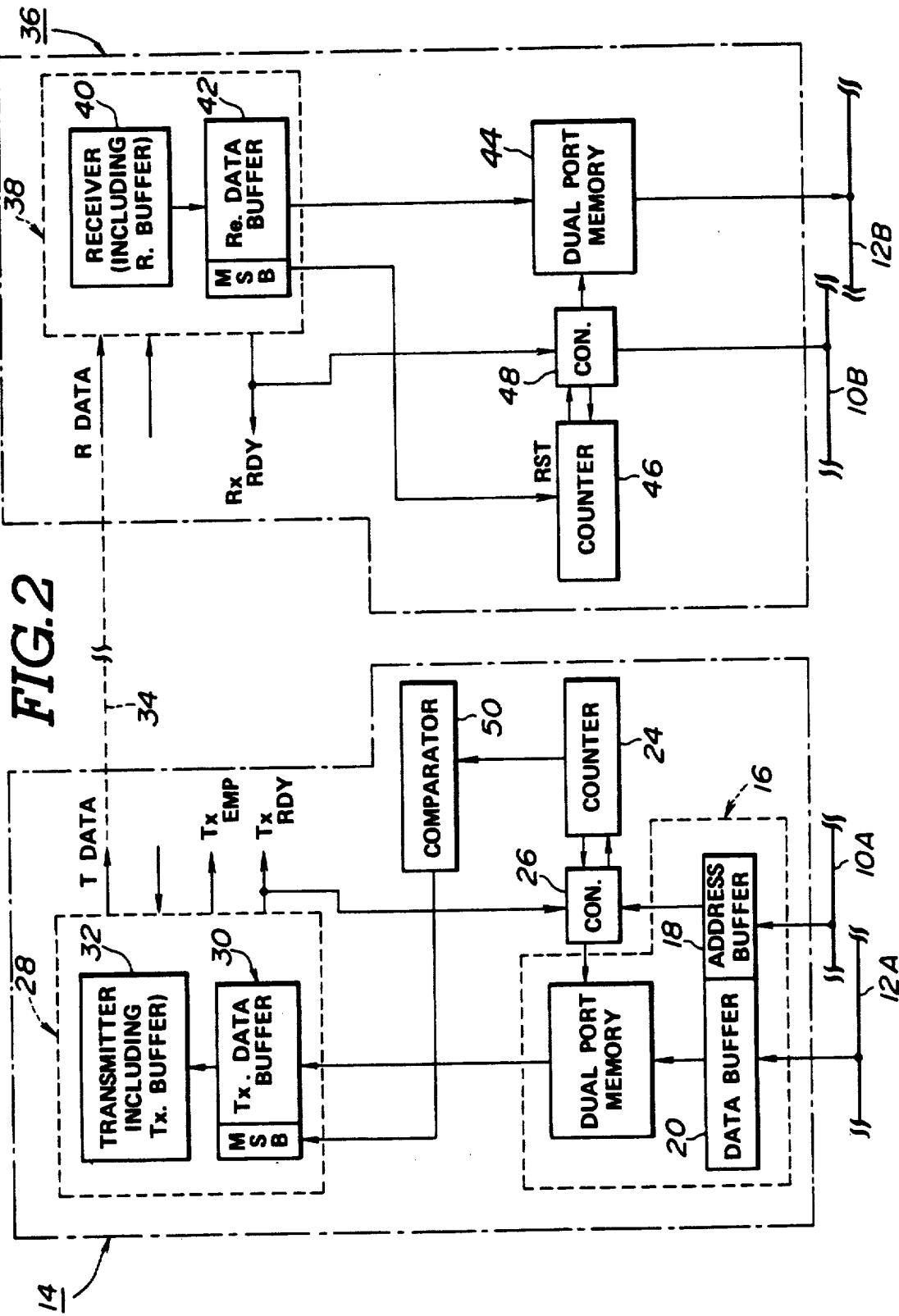
FIG. 2 is a circuit block diagram of the communication interface device in a second preferred embodiment according to the present invention.

FIG. 2 shows a second preferred embodiment according to the present invention.

Since the same reference numerals designate corresponding elements shown in FIG. 1, the descriptions thereof are omitted here.

As shown in FIG. 2, a comparator 50 is provided in the transmission interface 14. The comparator 50 compares the counted value in the counter 24 with a set value. When the comparator 50 confirms that the counted value coincides with the set value, a specific bit of the transmission data buffer 30 (in this embodiment, a MSB (Most Significant Bit) is controlled to a logic "1" level. The bit information is included in the transmission data T DATA.

It is noted that when the specific bit (MSB) of the received data fed into the reception data buffer 42 in the reception interface 36 is turned to a logic "1" level, the counter 46 is reset.

Since the counter 46 is reset whenever the counted value of the counter 24 coincides with the set value, a normal communication of data is reinitiated at the next cycle of communication at which the counted value in the counter 24 coincides with the set value even if the data string is disordered due to a communication error. Hence, the reliability of communicated data can be improved.

When the occurrence of error in the receiver is confirmed and the counter 46 reset, a program, in which the access of the CPU in the receiver to the dual port memory 44 is disabled during the cycle corresponding to the error in the receiver, may be executed. Consequently, influence of the communication error on the data communication can be minimized. In this embodiment, the counter 46 is reset upon receipt of the bit information described above. Alternatively, the counter 46 may be preset.

As described hereinabove, since, in the communication interface device according to the present invention, the data to be transmitted is automatically fetched from the bus connected to the CPU in the transmitter and the received data is held in the receiver, the processing circuit in the receiver does not participate the data transmission and can fetch the received data at any time. Hence, the processing load imposed on the processing circuits in both transmitter and receiver can be greatly reduced. Hence, the capacity of the processing circuit can be more effectively utilized. Consequently, a high-speed real time control of the vehicular engine and so on can be achieved.

It will fully be appreciated by those skilled in the art that the foregoing description is made in terms of the preferred embodiments and various changes and modifications may be made without departing from the scope of the present invention which is to be defined by the appended claims.

What is claimed is:

1. A device for interfacing data communications between a transmitter having a first processing unit, a first data bus, and a first address bus and a receiver having a second processing unit, a second data bus, and a second address bus comprising:
   (a) a first data storage circuit connected to the first data bus and the first address bus for receiving and storing parallel form data transmitted by the first processing unit onto the first data bus;
   (b) a transmission data buffer connected to the first data storage circuit for holding the data received and stored by the first data storage circuit;
   (c) a transmission unit connected to the transmission data buffer and to a data transmission line for transmitting the data held by the transmission data buffer over the data transmission line;
   (d) a reception unit connected to the transmission line for receiving the data transmitted over the data transmission line by the transmission unit;
   (e) a second data storage circuit connected to the reception unit and to the second data bus and the second address bus for holding the data received by the reception unit so that the data held by the second data storage circuit can be supplied to the second processing unit via the second data bus;
   wherein the first data storage circuit comprises:
   a data buffer connected to the first data bus for receiving the parallel form data transmitted by the first processing unit onto the first data bus;
   an address buffer connected to the first address bus for receiving address data transmitted by the first processing unit onto the first address bus;

a first timing control circuit connected to the address buffer to receive an input signal therefrom, each input signal generated at a time when address data on the address bus is received by the address buffer;

a first counter connected to the first timing control circuit to count the number of input signals received; and a first dual port memory connected to the data buffer and to the transmission data buffer for storing the data received by the data buffer as a series of data bytes, the dual port memory having a plurality of data storage addresses, the series of data bytes being stored in a series of contiguous data storage addresses beginning with a predetermined data storage address, each data byte being stored in an address of the dual port memory specified according to a counted value in the first counter;

whereby handling and transmission of data stored in the first dual port memory is achieved without CPU intervention.

2. An interface device as set forth in claim 1 wherein the transmission unit comprises a transmission buffer connected to the transmission data buffer for converting the data held by the transmission data buffer into serial form data and a transmitter connected to the transmission line for transmitting the serial form data converted into serial form by the transmission buffer to the data transmission line.

3. An interface device as set forth in claim 2 wherein the reception unit comprises a receive buffer for converting the serial form data received from the transmitter over the data transmission line into parallel form and a reception data buffer for holding the parallel form data.

4. An interface device as set forth in claim 3 wherein the second data storage circuit comprises:
(a) a second dual port memory connected to the reception data buffer and having a plurality of data storage addresses for storing the data held in the reception data buffer as a series of data bytes in a series of contiguous data storage addresses beginning with a predetermined data storage address,
(b) a second timing control circuit connected to the reception data buffer and to the second dual port memory; and
(c) a second counter connected to the second timing control circuit for specifying the address of the second dual port memory into which the data from the reception data buffer is stored, the address of the second dual port memory being determined according to a count of a number of signals outputted by the reception data buffer maintained by the counter, each signal indicating that the reception data buffer has become empty.

5. An interface device as set forth in claim 4 wherein the second dual port memory is connected to a receiver having a second processing unit and a second data bus at the second data bus, and the second dual port memory is a type of dual port memory which inhibits access by the second processing unit while data is being written into the second dual port memory and allows access otherwise.

6. An interface device as set forth in claim 1 wherein:
the transmission data buffer is connected to the first dual port memory for holding the data stored in the first dual port memory and connected to the first timing control circuit for producing and outputting a signal input to the first timing control circuit indicating that the transmission data buffer has become empty, and wherein:
the first counter is reset before the data are held in the transmission data buffer and counts the signals outputted from the transmission data buffer.

7. An interface device as set forth in claim 6 which further comprises a comparator connected to the first counter and to the transmission data buffer for comparing the counted value in the first counter with a set value and for outputting a logic signal to a specific bit portion of the transmission data buffer when the counted value in the first counter reaches a set value.

8. An interface device as set forth in claim 7 wherein:
the reception unit comprises a reception buffer connected to the transmission line for receiving data sent over the transmission line and a reception data buffer connected to the reception buffer for holding the data received from the data transmission line and outputting a signal indicating that the reception data buffer has become empty, and wherein:
the second data storage unit comprises a second dual port memory, a second timing control circuit connected to the reception data buffer and to the dual port memory, and a second counter connected to the second timing control circuit for counting the number of data bytes stored in the second dual port memory according to the number of signals output by the reception data buffer, the counter being reset when the reception data buffer receives a data byte having a specific bit portion in which the logic signal from the comparator is present.

9. An interface device for transmitting a bit parallel data present on a first data bus connected to a first central processing unit (CPU) to a second bit parallel bus connected to a second CPU over a transmission line comprising:
(a) a transmitting unit having a data buffer connected to the data bus for receiving and holding a series of data bytes present on the first data bus, an address buffer for receiving and holding an address corresponding to the transmitting unit present on a first address bus connected to the first CPU and for outputting a first signal when the address is received, a first timing control circuit connected to receive the first signal, a first counter connected to the first timing control circuit to increment each time the input signal is received, a first dual port memory having a plurality of memory locations respectively corresponding to count values of the counter and addressable by the counter connected to the data buffer for storing the data received by the data buffer in memory locations addressed by the first counter, a transmission data buffer connected to receive and hold the data stored in the first dual port memory and to produce a transfer ready signal when the transmission data buffer becomes empty, and a transmitter connected to the transmission data buffer to receive the data held in the transmission data buffer, thereby making the transmission data buffer empty, to convert the data received from the transmission data buffer into a bit serial data and to transmit the serial data over the transmission line, the first counter being reset before the data are received and held by the transmission data buffer, the first timing control circuit being connected to receive the transfer ready signal and to increment the first counter each time the transfer ready signal is received; and (b) a reception unit having a receiver connected to the transmission line for receiving the serial data transmitted from the transmitting unit and converting the serial data into corresponding parallel data, a reception data buffer connected to receive and hold the parallel data from the receiver and to produce a receiver ready signal when data have been received, a second dual port memory connected to the reception data buffer for receiving and holding the parallel data from the reception data buffer, a second timing control circuit connected to receive the receive ready signal and connected to the second dual port memory, a second counter connected to the second timing control circuit to increment each time the receive ready signal is received, the second dual port memory being addressed for receiving and holding data in accordance with a count value in the second counter, the second dual port memory being connected to the second data bus.

10. An interface as set forth in claim 9, wherein the transmitting unit further includes a comparator connected to the first counter and the transmission data buffer for comparing each counter value of the first counter with a set value, and wherein when the comparator confirms that one of the counter values coincides with the set value, a predetermined bit of the data in the data transmission buffer is set to a predetermined logical value which is included in the data to be transmitted to the reception unit; and the second counter is connected to the reception data buffer to reset when the reception data buffer receives the data having the predetermined bit so that the second counter is reset whenever the counted value of the first counter indicates the set value of the comparator.

11. An interface as set forth in claim 10 wherein the predetermined bit is a most significant bit of the data and the predetermined logical value is 1.

* * * * *